United States Patent

[11] 3,632,143

[72] Inventor: Gerald G. Lessmann, Pittsburgh, Pa.
[21] Appl. No.: 834,709
[22] Filed: June 19, 1969
[45] Patented: Jan. 4, 1972
[73] Assignee: Westinghouse Electric Corporation, Pittsburgh, Pa.

[54] BIMETALLIC COUPLING JOINT FOR TUBES OF DISSIMILAR MATERIALS
13 Claims, 4 Drawing Figs.

[52] U.S. Cl. .................................. 285/187, 285/363, 277/26
[51] Int. Cl. .................................. F16l 55/00
[50] Field of Search .......................... 285/332.2, 332.3, 187; 277/26, 236

[56] References Cited
UNITED STATES PATENTS

| | | | |
|---|---|---|---|
| 2,312,909 | 3/1943 | Jeffery | 285/187 |
| 3,311,392 | 3/1967 | Buschow | 277/236 X |
| 3,411,812 | 11/1968 | Prince et al. | 27/26 X |

Primary Examiner—Dave W. Arola
Attorneys—F. Shapoe and L. P. Johns

ABSTRACT: A bimetallic metallurgical joint between tubes having widely differing coefficients of thermal expansion particularly wherein one tube comprises a low-coefficient-expansion refractory metal and the other tube is of a conventional alloy. The joint is designed to maintain its integrity while accommodating repeated severe thermal cycles.

INVENTOR
Gerald G. Lessmann

BIMETALLIC COUPLING JOINT FOR TUBES OF DISSIMILAR MATERIALS

BACKGROUND OF THE INVENTION

1. Field of the Invention

This invention relates to a bimetallic joint for connecting tubular members such as piping, tubing, conduits, or the like, having very dissimilar coefficients of thermal expansion suitable for use at temperatures of up to about 2,500° F. for carrying steam, hot gases, NaK, and so on. More particularly, the invention pertains to a tight, reliable joint between pipes of a reactive or refractory metal alloy and more conventional piping metals and alloys, having widely differing coefficients of thermal expansion.

2. Description of the Prior Art

There is a recurring need for a reliable leaktight connection or joint between tubes of different materials such as metals having substantially different coefficients of thermal expansion. Joints between refractory metals, such as base alloys of columbium or tantalum and more conventional nonrefractory metals, such as stainless steel, have presented a recurring problem in the art. Previous bimetallic joints have not been satisfactory for the high temperatures which are encountered in typical applications involving refractory metal alloys. That is particularly true where repeated severe temperature cycles occur.

In general, conventional simple mechanical joints have been unacceptable and are relatively unsatisfactory because of the severity of the environment coupled with the requirement for leaktightness and reliability. Brazing is of limited value for joining metals of such widely dissimilar characteristics because of the specialized environmental tolerance of the brazing alloys and specialized behavior achieved in brazed joints. This is in addition to the fact that brazed joints cannot be opened or broken readily and reclosed. That is, the brazing alloy represents a metallurgical discontinuity between two dissimilar materials which are selected to perform specialized functions, often at the limit of their capabilities. These functions coupled with the severe environmental resistance required in such applications cannot be satisfied in a general way by brazing. Finally, other methods of joining requiring the application of heat to the melting point of metals such as welding, leads to extensive formation of brittle intermetallic compound layers in refractory metal pipes resulting in mechanically unacceptable joints which often fracture on cooling from the welding temperature or fracture during normal handling or use.

Associated with the foregoing considerations is the problem of repeated thermal cycling. The joints of prior construction often have been unable to maintain their integrity when subjected to repeated severe thermal cycles. That is particularly true where the joint is provided between incompatible materials having widely differing coefficients of thermal expansion.

SUMMARY OF THE INVENTION

It has been found in accordance with this invention that the foregoing problems may be overcome by providing a bimetallic coupling joint for connecting a pipe of a refractory metal with a pipe of a more common metal, which metals have a widely different coefficient of thermal expansion, and said coupling joint comprising a pair of gasket-forming sheets of metal having substantially different coefficients of thermal expansion and being prebonded together at their interfaces to provide an intermetallic interface having a minimum thickness. The pair of gaskets are disposed between spaced end surfaces of flanges on the conduits which are to be joined together, the end surfaces of the flanges being inclined radially outwardly. The conduits are fastened together on opposite sides of the prebonded sheets by connection means attached to the flanges which means have a coefficient of thermal expansion substantially less than that of the conduit metal having the higher coefficient of expansion.

Accordingly, it is a general object of this invention to provide a bimetallic joint for dissimilar metals which includes a combined metallurgical-mechanical sealed joint.

It is another object of this invention to provide a bimetallic joint for pipes of dissimilar metals which maintain its integrity while accommodating repeated severe thermal cycling.

It is another object of this invention to provide wide design flexibility in a coupling joint to accommodate widely diverse systems involving cyclic thermal and load conditions while simultaneously maintaining reliable joint integrity.

It is another object of this invention to provide a bimetallic gasket joint for pipes of metal having widely different coefficients of thermal expansion which maintains a constant pressure on the joint over a wide range of temperature cycles.

Finally, it is an object of this invention to satisfy the foregoing objects and desiderata in an effective manner.

Briefly, the invention provides a coupling between a pair of conduits of substantially different coefficients of thermal expansion, the difference being of the order of at least 4 microinches per inch per ° F., comprising first and second conduits having inner and outer tubular walls, the first conduit having a higher coefficient of thermal expansion than the second conduit, the first conduit having a cone-shaped or dished end surface inclined at an angle to a vertical radial plane through said conduit, a second conduit having an end surface inclined at a substantially matching angle to the radial plane, a flexible metallic gasket interposed between said end surfaces and comprising superposed layers of metals having different coefficients of thermal expansion with the metal layer having the higher coefficient of expansion being disposed adjacent to the first conduit, the layers of metal having metallurgically bonded interfaces joined in a leakproof manner, and mechanical connection means for holding the inclined end surfaces in surface-to-surface contact with adjacent layers of the gasket, whereby the coupling maintains a fluidtight joint and a stable mechanical relationship between the first and second conduits regardless of the differential radial and axial contraction and expansion of the conduits during repeated large changes in temperatures and pressure of a fluid flowing through the conduits.

BRIEF DESCRIPTION OF THE DRAWINGS

For a better understanding of the nature and objects of this invention, reference is made to the drawings, in which similar numerals refer to similar parts throughout the several views to the drawings, and in which.

DESCRIPTION OF THE PREFERRED EMBODIMENTS

Figure 1:
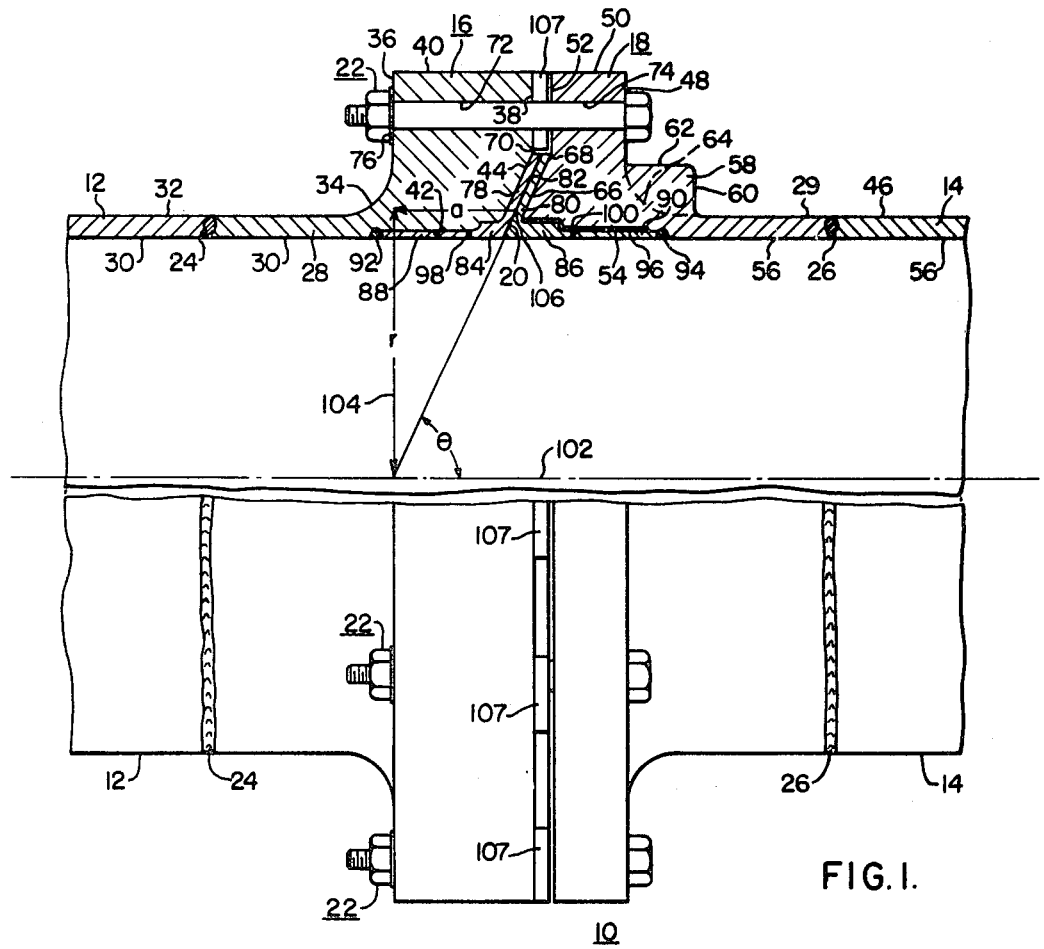
FIG. 1 is an illustration of the preferred embodiment of the invention, showing the upper portion in vertical section and a lower portion in elevation.

In FIG. 1 a joint or coupling generally indicated at 10 is disposed between a pair of tubes or conduits 12 and 14 composed of materials having substantially different coefficients of thermal expansion. The coupling 10 is provided for accommodating conduits having widely different coefficients of thermal expansion for conducting fluids over a wide temperature range from below room temperature up to the maximum useful temperature of the weaker (at temperature) alloy. For example, the conduit 12 may be composed of any material such as a metal or alloy having a high or relatively high coefficient of thermal expansion such as the austenitic type of steel generally designated as AISI 321, the coefficient of expansion of which is 10.7 microinches/inch/° F. The conduit 14 may be composed of any material such as a metal or alloy having a low or relatively low coefficient of thermal expansion such as Cb–1Zr (columbium–1 percent zirconium), the coefficient of expansion of which is 4.4 microinches/inch/° F., the difference in the thermal expansions being about 6.3 microinches per inch per ° F. However, the coupling will be suitable for connecting satisfactorily conduits of metals whose coefficients of thermal expansion differ by less than 4 microinches per inch per ° F.

The coupling 10 preferably includes a pair of flangelike members, such as a first flange 16 forming a part of conduit 12, a second flange 18 forming a part of conduit 14, gasket means 20, and joining or clamping means for holding the flanges together in surface-to-surface contact with the gasket 20, such as nut and bolt assemblies 22.

The flanges 16 and 18 are each composed of a material which is the same as or similar to the corresponding conduits 12 and 14. For example, the conduit 12 having a high coefficient of thermal expansion compared to that of the conduit 14, is provided with the flange 16 of AISI 321 alloy or similar austenitic steel having the same or substantially the same coefficient of thermal expansion. Similarly, the flange 18 comprises Cb–1Zr alloy or similar alloy having a coefficient of thermal expansion which is the same or substantially similar to that of the conduit 14. The flanges 16 and 18 are attached at annular portions 28 and 29 to the conduits 12 and 14 by welds 24 and 26 respectively. Where the materials of the conduits 12 and 14 are composed of materials that are suitable for forming at elevated temperatures such as by forging or upsetting procedures, the flanges 16 and 18 my be formed as an integral part of the conduits 12 and 14, whereby the welds 24 and 26 are unnecessary.

The flange 16 constitutes a thickened or enlarged extension of the conduit 12 with common inner surfaces 30 and outer surfaces 32. The flange 16 includes a fillet 34 joining the outer surface 32 and an external side surface 36 of the flange. In addition, the flange 16 includes an end surface 38, an outer peripheral surface 40, and a recessed inner surface 42 beginning beyond the annular portion 28. The flange 16 also includes a conically inclined or dished end surface 44 which end surface extends from the end surface 38 to the recessed inner surface 42. The end surface 44 is inclined at an angle to a vertical plane through the conduit so that it extends from the inner surface 30 toward the flange 18; that is, the end surface 44 is inclined outwardly to the right as viewed in FIG. 1.

The flange 18 has an extension 29 welded at 26 and having a common inner surface 56 and outer surface 46 with pipe 14. Flange 18 is in juxtaposition to the flange 16. The flange 18 includes an external side surface 48, a peripheral surface 50, and an end surface 52, the last of which is spaced from and faces the annular side surface 38 of the flange 16. In addition, the flange 18 includes an inner surface 54 which is recessed radially outwardly from the inner surface 56 of the conduit 14. For reinforcement the flange 18 includes an enlarged or thickened flange portion 58 which is bounded by a radial side surface 60 and peripheral surface 62. In the alternative the enlarged portion 58 may be omitted and a fillet 64 (shown in dotted lines) may be substituted in a manner similar to the fillet 34 of the flange 16. Moreover, if necessary, for reinforcement of the flange 16 an enlarged portion similar to the portions 58 may be substituted for the fillet 34.

The flange 18 also includes an outwardly coned inclined surface 66 which extends inwardly from the side surface 52 to the surface 54, a junction line 68 formed where the surface 52 and 66 meet is axially spaced from a similar line 70 formed where the surface 38 and 44 meet on the flange 16.

As shown in FIG. 1 means are provided for holding the joint together, comprising a plurality of nut and bolt assemblies 22 disposed at spaced intervals around the flanges 16 and 18 and which extend through aligned apertures 72 and 74 in the flanges 16 and 18, respectively, and includes a washer 76 adjacent the external side surface 36 of the flange 16. Where the assembly 22 and the flange 16 are composed of such compositions that they will interact or diffuse together particularly at higher temperatures of operation, the washer 76 may be an inert composition that prevents such interaction. A similar washer may be applied between the head of bolt 22 and the external side surface 48 on flange 18.

The gasket means 20 includes at least two cone-shaped layers 78 and 80 of annular configuration disposed between the surfaces 44 and 66. The layers 78 and 80 have thickness range of from about 0.015 inch to about 0.25 inch, the minimum total thickness being about 0.030 inch. However, the minimum thickness is primarily dependent upon ease of handling and fabrication. Fabrication costs rise sharply with thinner gaskets. Though the surfaces 44 and 66 are preferably parallel, they may be slightly tapered with respect to each other, or otherwise shaped for preventing internal fluid pressures within the conduits 12 and 14 from blowing the gasket layers 78 and 80 radially outwardly or to achieve locally higher clamping pressures on selected areas of the gasket layers.

More particularly, it is important that the layers 78 and 80 be composed of materials that are compatible in welding with the materials of which the corresponding flanges or tubular extension 88 and 90 are composed for the reasons indicated below.

The layer 78 is preferably composed of a material similar to the material of the flange 16; or in the alternative, the layer 78 is composed of a material having a coefficient of linear thermal expansion substantially corresponding to that of the flange 16.

The layer 80 is composed of a material similar to the flange 18; or, in the alternative, is composed of a material having a relatively high coefficient of linear thermal expansion substantially corresponding to that of the flange 18.

The layers 78 and 80 may be composed of various combinations of materials, and illustrative examples which have been evaluated are listed in the following table. For example, when the conduit 12 and the flange 16 are composed of metals having the same or substantially similar coefficients of thermal expansion (a relatively high coefficient), the layer 78 is composed of a metal of the same or substantially the same coefficient of thermal expansion. The same requirements pertain to the layer 80, the flange 18, and the conduit 14.

TABLE

Composition of Some Gasket Layer Combinations of

Refractory and Conventional High Temperature

Materials

Cb/321 (AISI)*
Cb/347 (AISI)
Cb/Inconel 600
Cb–1Zr/347 (AISI)
Cb–1Zr/Inconel 600
Ta/321 (AISI)
Ta/347 (AISI)
Ta/Inconel 600
Ta/Hastelloy N
FS–85/321 (AISI)
FS–85/347 (AISI)
FS–85/Inconel 600
FS–85/Hastelloy N
T–222/321 (AISI)
T–222/347 (AISI)
T–222/Inconel 600

*Nominal Compositions

AISI 321–(Fe–18Cr–10Ni–0.08C Max—Ti stablilized)

AISI 347–(Fe–18Cr–11Ni–0.08C Max—Cb stabilized)

Inconel 600–(Ni–16Cr–7Fe–2Cb)

Hastelloy N–(Ni–17Mo–7Cr–5FE–0.06–0.1B–0.5 AL)

FS–85–(Cb–27Ia–10W–1Zr)

T–222 (Ta–10W–2.4Hf–0.01C)

To produce a fluidtight joint between the layers 78 and 80 the interfaces of the layers are metallurgically bonded together in a leakproof manner. The bonding is accomplished by providing a metallurgical joint in any suitable manner such as diffusion bonding, gas-pressure bonding, explosive cladding, or a combination of these processes. The several combinations of layers listed in the table were explosively bonded. The resulting bonded zone or ares 82 is an area where the different metals have interdiffused, intermixed, or formed intermetallic compounds, having a thickness of up to 0.5 mil, and preferably less than 0.2 mil. Bonded-zone thicknesses of greater than 0.5 mil may deteriorate and crack due to sever thermal cycling in use; the smaller the thickness of the zone the better. In the combinations of the table, a joint thickness of 0.2 mil or less was found to be excellent.

An explosive bond is preferred over any other type such as generally achieved with brazing and welding since it avoids excessive interdiffusion between the gasket metal layers and hence excessive development of an intermetallic zone at the interface. Interdiffusion during subsequent use at elevated temperatures such as occurs at temperatures of up to 1,500° F. and higher is also undesirable. Interdiffusion between the materials constituting the bonded layers 78 and 80 is undesirable in order to avoid the formation of enlarged zones of intermetallic compounds which result in brittleness and may eventually cause failure of the bond 82 when subjected to strain caused by thermal cycling.

By proper selection of materials for the assembly 22 the maintenance of a nearly constant pressure on the gasket 20 is possible during thermal cycling between low and elevated temperatures of operation. The assembly 22 in the preferred embodiment is composed of a metal having a low coefficient of linear thermal expansion comparable to that of the flange 18 and/or the conduit 14. In the case of a joint between a refractory metal and convention alloy suitable for piping the low expansion alloy is also generally the stronger at temperature and hence the best for use for the bolt and nut assembly 22. If desired the assembly 22 may be composed of a metal having a high expansion coefficient (comparable to that of the flange 16), and in this case the angles of inclination of the end surfaces 44 and 66 are reversed to the opposite side of a radial plane extending through the pipe, that is, at an angle extending to the left as viewed in FIG. 1.

As shown in FIG. 1 the layers 78 and 80 have flanges 84 and 86, respectively, with flange extensions 88 and 90, having a reduced thickness as compared to the flanges 84 and 86. The flanges are relatively flexible and compensate for radial movement of the joint during thermal expansion and contraction.

As shown the flange extension 88 is welded at 98 to the flange 82. Likewise, the flange extension 90 is welded at 100 to the flange 86. The extremities of the flange extensions 88 and 90 are welded at 92 and 94 respectively to the inner surfaces 30 and 56 of the flanges 16 and 18. The flanges extension 88 is seated within the recessed inner surface 42. Likewise the flange 86 and the extension 90 are seated within and only partially fill the recessed inner surface 54 of the flange 18. It is preferred that there is a slight clearance 96 between the flange 86 and extension 90 with respect to the recessed inner surface 54 to enable movement of the flange and extension into the clearance space at the higher operating temperatures. Such clearance minimizes the development of additional stains on the bond 82 beyond those incurred due to relative local expansion differences of the two elements 78 and 80 of gasket means 20 during thermal cycling.

While the flange extensions 88 and 90 usually will be of the same composition as the corresponding layers 78 and 80, the configuration of the layers in combination with the corresponding flanges and flange extensions may be of a unitized L-shaped configuration as shown in FIG. 1. However, the flange extensions 88 and 90 may be composed of a slightly different metal, or they may be composed of the same material as the corresponding layers 78 and 80 which compositions are not readily formable into the L-shaped configuration, in which event they may be welded to layers 78 and 80.

Both the angle of inclination of the bond zone 82 and the layers 78 and 90 are disposed at an angle to the vertical radial plane through the pipes 12 and 14. The angle is an acute angle with respect to the conduit axis and facing the conduit 14. A preferred angle of inclination is necessary in order to minimize or eliminate excessive thermally induced plastic strain on the several parts involved, namely, the layers 78 and 80, the bond 82 therebetween and the assembly 22. This is necessary to avoid loosening of the coupling joint in service when thermal cycling occurs. By this means the gasket is mechanically restrained and the joint continues to function properly under normal system design loads. The preferred angle is the angle theta ($\theta$) (FIG. 1) which is formed by the intersection of an extension of the plane of the bond 82 with the center axis 102 and the intersection of the radial plane 104 extending from the annular side surface 36 of the flange 16.

More particularly, the angle theta (for a simple case) is calculated by assuming that only two joint materials, i.e., a high and a low coefficient of thermal expansion metal are used for all of the components. For an exemplary calculation consider any point 106 in the bond zone 82 of a gasket, which point is at a distance $a$ from the radial plane through the surface 36 and also is at a distance $r$ from axis 102. A relative lineal change in distance between the surfaces 44 and 66 at point 106 results in the axial tightening (or loosening) of the joint at said surfaces, which is expressed by the formula $\Delta a = a \Delta T \Delta \alpha$, where $\Delta T$ is temperature change and $\Delta \alpha$ is the difference in expansion coefficients. Likewise, a radial loosening (or tightening) of the point 106 is expressed by the formula $\Delta r = r \Delta T \Delta \alpha$. From these the preferred angle theta can be found by the formula:

$$\tan \theta = (r \Delta T \Delta \alpha)/(a \Delta T \Delta \alpha) = r/a$$

The angle $\theta$ provides for exact compensation of radial and axial compression differences such that the joint preload in the assembly 22 is substantially maintained during thermal cycling.

The dimension $a$ is such that for each radial position along the interface or bond 82 that relative motion (loosening) of the flanges 16 and 18 is compensated by axial motion (tightening) to maintain a relatively constant flange loading. Hence, the bimetallic bond 82 is always maintained under an exact preload compression. This minimizes the risk of fracturing of the interface or bond 82 and also permits maintaining the design preload in the nut and bolt assembly 22. Thus, only thermal stresses occur across the bond zone 82 which can be readily accommodated. Where the bond 82 is properly formed, that is, to have a minimal amount intermetallics and is of a minimum thickness (less than 0.2 mil) the local stresses at the bond are satisfactorily accommodated. At the inner portions of the layer 78 and 80, the flange 86 and flange extension 90 are free to move into the clearance 96 during operation of the assembly at extremely elevated temperatures to facilitate accommodation of the gross-diametrical strain across the joint.

In addition to the foregoing construction, means for retaining the gasket 20 in the desired position are provided. Such means may include either an annular protuberance or a series of peripherally spaced members 107 (as shown) extending around the clearance space between the flanges 16 and 18. Such means provides an inner axially extending surface 108 for the purpose of abutting and restraining the outer ends of the gasket layers 78 and 80 in the event that said layers are forced by internal pressures or thermal strains beyond their intended positions between the surfaces 44 and 66.

The following example is illustrative of the invention:

a bimetal joint, similar to that shown in FIG. 1, is provided between a pair of tubes, one tube being composed of type AISI 304 stainless steel and the other tube being composed of a columbium-base alloy containing 1 percent zirconium. The tubes have an interval diameter of 1.5 inches and a wall thickness of 0.030 inch. The stainless steel (type 304) tube is provided with an end flange composed of Inconel 718, and the other tube (Cb—1Zr) has an end flange composed of the Cb–1Zr alloy.

The bolt and nut assemblies are composed of a cold-worked tantalum-base alloy (T–111). The washers between the bolts and Inconel 718 flange are composed of tantalum base alloy (T–111) having the surfaces adjacent to the flange being flame sprayed with $Al_2O_3$ to avoid diffusion between the washers and the flange.

The gasket between the flanges includes two layers of flexible metallic members. The member adjacent to the Inconel flange is 0.05 inch thick and is composed of type 347 stainless steel. The member adjacent to the other flange (Cb–1Zr) is 0.035 inch thick and is composed of a tantalum base alloy (T–222). The gasket members are joined together by explosive bonding to form a bonded zone having a thickness of 0.2 mil.

When the joint is assembled in preload condition with the nut and bolt assemblies and with the gasket tightened in place, the opposite ends of the flanges are 1.25 inches apart. The angle of inclination of the gasket joint is 47.25°.

Figure 2:
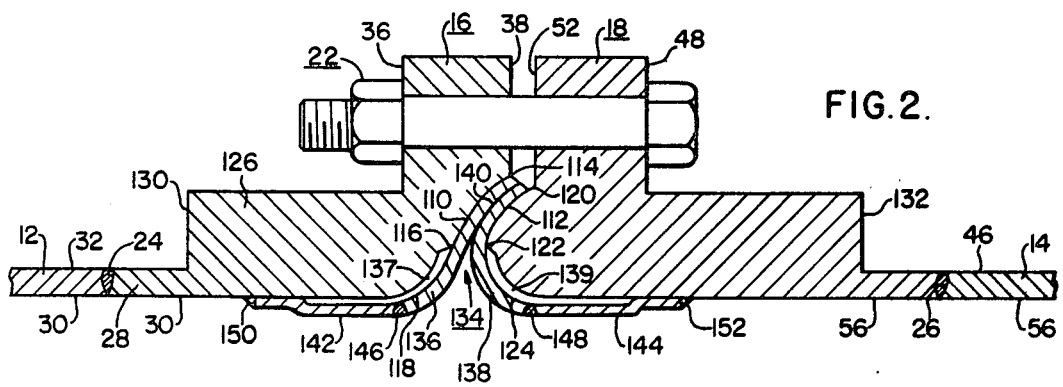
FIG. 2 is a longitudinal sectional view through a portion of a coupled pipe showing another embodiment of the invention.

Another embodiment of the invention is shown in FIG. 2 which differs primarily from that of FIG. 1 in that the flanges 16 and 18 are provided with end surfaces 110 and 112 having an arcuate or dish-shaped configuration. More particularly, the end surface 110 is concave and the end surface 112 is convex. In a preferred embodiment the end surfaces 110 and 112 are concentrically disposed.

As shown in FIG. 2, the outer periphery of the surface 110 terminates at a junction 114 with the annular side surface 38. The inner extremity of the surface 110 terminates at a peripheral line 116 which is axially spaced further to the left away from the flange 18 than is the peripheral line 114.

In a similar manner the convex end surface 112 has an outer peripheral line 120 where it meets the annular side surface 52 of the flange 18. The inner periphery of the end surface 112 terminates at a line 122 formed with the upper end of a surface 124.

Each flange 16 and 18 may have an enlarged body portion 126 and 128, respectively, which portions reinforce the overall joint structure including the end surfaces 110 and 112. As viewed in FIG. 2, the left end of the body portion 126 terminates at an annular sidewall 130 and the body portion 128 terminates at the right end with an annular sidewall 132.

A circular gasket 134 is disposed between the end surfaces 110 and 112 where it is held secure in place by the nut and bolt assembly 22. The gasket 134 is composed of two sheetlike layers 136 and 138 having a bonded interface 140 which interface is coextensive with the end surfaces 110 and 112. The periphery of the layers 136 and 138 preferably terminates in alignment with junctions 114 and 120. The inner end portions of the layers 136 and 138 are of bifurcated configuration with oppositely extending arcuate portions which terminate in flanges 142 and 144 which flanges are connected thereto by welds 146 and 148. In the alternative flanges 142 and 144 may be an integral part of the layers 136 and 138 respectively. As shown in FIG. 2 the remote extremities of the flanges 142 and 144 are welded at 150 and 152 in a fluidtight manner to the inner conduit surfaces 30 and 56 respectively.

Moreover, although the end surfaces 110 and 112 are arcuate or dish shaped, they are generally disposed in a zone that is inclined to a vertical radial plane. For example, the zone between the end surfaces 110 and 112 (occupied by the layers 136 and 138) extends at an angle from the lines 116 and 122 at the lower end of the zone to the junctions 114 and 120 at the upper end of the zone. It is noted that the junctions 114 and 120 are to the right of the lines 116 and 122, respectively, as viewed in FIG. 2.

The layers 136 and 138 are preferably composed of materials having coefficients of thermal expansion substantially equal to those of the materials of which the adjacent members, namely the flanges 16 and 18, are composed. Thus, the flange 18, being composed of a material of relatively low linear thermal coefficient of expansion, has the layer 138 also of low thermal coefficient of expansion, in surface-to-surface contact with the end surface 112. Likewise the flange 16, having a relatively high coefficient of linear thermal expansion has the layer 136 also of a high thermal coefficient of expansion, in surface-to-surface contact with the end surface 110.

In operation the joint or coupling shown in FIG. 2 functions in a manner substantially similar to that of FIG. 1. The arcuately disposed gasket layers 136 and 138 also move in compensating linear and radial directions due to thermal expansion and contractions and thereby maintain a substantially constant load on the assembly 22. The construction of FIG. 2 compensates better for the case where there is a thermal gradient in the radial direction and/or when there is present a nonlinear coefficient of expansion with changes in temperature.

As the portion of the coupling including the flange 16 expands outwardly at a greater rate than the portion of the coupling including the flange 18, the lower bifurcated end portions of the layers 136 and 138 move freely within the spaces 137 and 139 in closer proximity of the convex surfaces 118 and 124. As a result the bonded interface 140 is relieved of most stresses due to differences in expansion caused by the thermal gradient across the interface. Where the assembly 22 is composed of a material having a high expansion coefficient (comparable with that of the flange 16), the curved surfaces are inclined in a reverse direction to the opposite side of a radial plane; that is, on the left as viewed in FIG. 2.

Figure 3:
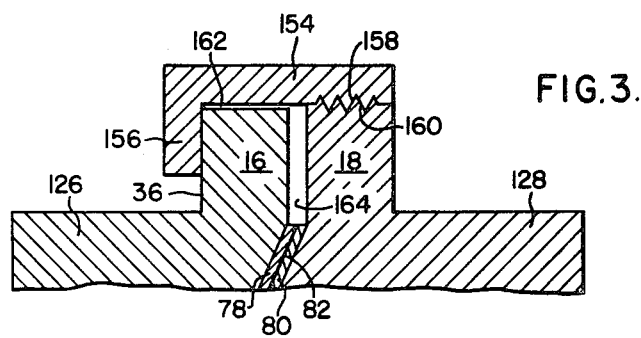
FIGS. 3 and 4 are fragmentary longitudinal sectional views showing additional embodiments of the invention.

Another embodiment of the invention is shown in FIG. 3 which discloses members substantially similar to the embodiments of FIGS. 1 and 2 and which differs primarily in the clamping means for holding the coupling together. The clamping means includes an annular ring 154 having an inturned flange 156 and having a threaded surface portion 158 which engages a corresponding threaded surface 160 on the outer periphery of the flange 18. The annular ring 154 is composed of a material having a very low coefficient of linear thermal expansion such as that of which the flange 118 is composed. The clamping means including the ring 154 constitutes an alternative to the nut and bolt assembly 22. An annular clearance 162 is provided between the outer extremity of the flange 16 and the ring 154. Likewise, a clearance 164 extends radially between the flanges 16 and 18 in a manner similar to the embodiments shown in FIGS. 1 and 2.

Figure 4:
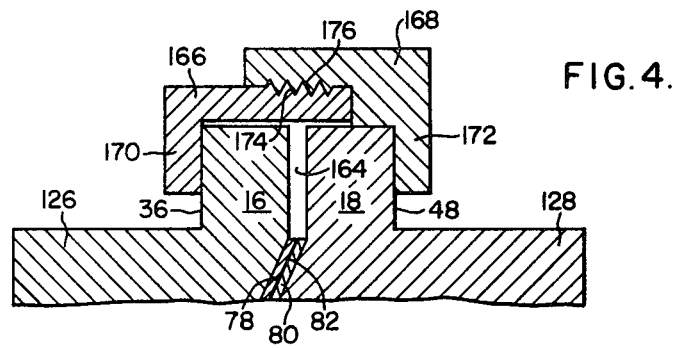

Finally another embodiment of the clamping means is shown in FIG. 4 which means includes an inner ring 166 and an outer ring 168. The ring 116 includes an inturned flange 170 engageable with the side surface 36 of the flange 16. Likewise, the ring 168 includes an inturned flange 172 which engages the annular side surface of the flange 18. As shown in FIG. 4 the rings 166 and 168 have cooperating interlocking means such as threaded surfaces 174 and 176, respectively. The rings 166 and 168 are composed of materials having the same or substantially similar coefficients of linear thermal expansion which material substantially corresponds to that of the ring 18.

Accordingly, the device of the present invention provides a combination metallurgical and mechanical means for maintaining a leakproof and reliable coupling between conduits of widely differing coefficients of linear thermal expansion. The device includes flanges having uniquely contoured surfaces between which a preloaded gasket remains substantially unchanged throughout repeated severe thermal cycles in response to varying operating temperature limits. Moreover, it is understood that where the walls of the conduits are very thick, the end surfaces may be inclined between the inner and outer wall surfaces and thereby obviate the need for flanges, and suitable fastening means may be otherwise provided.

Various modifications may be made within the spirit of this invention.

What is claimed is:

1. A coupling joint between a pair of pipes of substantially different coefficients of thermal expansion and suitable for a coefficient difference of about 4 microinches per inch per °F., comprising first and second pipes having inner and outer wall surfaces, the first pipe having a higher coefficient of thermal expansion than the second pipe, the first pipe having an end surface inclined at an angle to a radial plane through the pipe, the second pipe having an end surface inclined at an angle substantially corresponding to that of the first pipe, a gasket interposed between the end surfaces and comprising superposed layers of metal having different coefficients of thermal expansion, the metal layer having the higher coefficient of expansion being disposed adjacent to the first pipe, the layers of metal having a metallurgically bonded interface, means for holding the inclined end surfaces in surface-to-surface contact with adjacent layers of the gasket, the means being composed of a material having a coefficient substantially equal to that of one of the first and second pipes, and the end surfaces being inclined with respect to the pipe axes in a direction forming an acute angle facing the pipe having a coefficient substantially equal to that of the holding means, whereby the coupling maintains a constant joint loading between the first and second pipes in response to differential radial and axial contractions and expansions of the pipes during repeated changes in temperatures of a fluid flowing through the pipes.

2. The coupling of claim 1 wherein the means for holding the inclined end surfaces in surface-to-surface contact with adjacent layers of the gasket include clamping means having a coefficient of thermal expansion substantially equal to that of the second pipe, and the angles of inclination of the end surfaces are inclined in directions extending from the inner tubular wall of the first pipe to the outer tubular wall of the second pipe.

3. The coupling of claim 1 wherein the means for holding the inclined end surfaces in surface-to-surface contact with adjacent layers of the gasket include clamping means having coefficient of thermal expansion substantially equal to that of the first pipe, and the angles of inclination of the end surfaces are inclined in directions extending from the inner tubular wall of the second pipe to the outer tubular wall of the first pipe.

4. The coupling of claim 1 wherein means for holding the pipe end surfaces in contact with the gasket includes flange means extending outwardly from the outer wall of each pipe, and the means also including clamping means for holding the flanges in fixed axial positions with respect to each other during varying operating temperatures.

5. The coupling of claim 1 wherein the means for holding the pipe end surfaces in contact with the gasket includes a peripheral flange on the first pipe, the peripheral flange having an annular side surface remote from the second pipe, the annular side surface of the peripheral flange being disposed in a radial plane of the first pipe, and the angle of inclination of the gasket bonded interfaces being in a plane that intersects the radial plane of the annular side surface substantially at the axis of the pipe.

6. The coupling of claim 1 wherein the inclined end surfaces of the first and second pipes are arcuate in substantially concentric configuration.

7. The coupling of claim 6 wherein the arcuate end surface of the first pipe is concave and that of the second pipe is convex.

8. The coupling of claim 7 wherein the gasket layers are arcuate in conformity with the end surfaces.

9. The coupling of claim 1 wherein the bonded interface between the metal layers has a thickness of up to about 0.5 mil.

10. The coupling of claim 1 in which the means for holding the end surfaces and gasket together include a peripheral flange on each pipe, and tension means for holding the flanges against axial separation.

11. The coupling of claim 10, in which the tension means include nut and bolt assemblies extending through and between the flanges.

12. The coupling of claim 10 in which the tension means include clamping means for engaging the flanges.

13. A coupling joint between a pair of pipes of substantially different coefficients of thermal expansion, comprising first and second pipes having inner and outer wall surfaces, the first pipe having a higher coefficient of thermal expansion than the second pipe, the first pipe having an integral first flange extending radially outwardly from the outer wall surface, the second pipe having an integral second flange extending radially outwardly from the outer wall surface, the first flange having an end surface inclined at an angle to a radial plane through the pipe, the second flange having an end surface inclined at an angle substantially corresponding to that of the first flange, a gasket interposed between the end surfaces and comprising superposed layers of metal, having different coefficients of thermal expansion, the metal layer having the higher coefficient of expansion being disposed adjacent to the first flange, the gasket layers having a metallurgically bonded interface, means including bolts extending between the flanges for holding the joint together, the bolts being composed of a metal having a coefficient of thermal expansion substantially equal to that of the second pipe, and the angle of inclination of the end surfaces being an acute angle facing the second pipe.

* * * * *